United States Patent

Grönwoldt et al.

Patent Number: 5,823,411
Date of Patent: Oct. 20, 1998

[54] LOCKING DEVICE FOR SUITCASES AND TRUNKS, ESPECIALLY ROOF TRUNKS FOR MOTOR VEHICLES

[75] Inventors: Rolf Grönwoldt, Ruppichteroth; Siegfried Deisenhofer, Herrieden; Artur Hirtsiefer, Ruppichteroth-Winterscheid, all of Germany

[73] Assignees: Huwil-Werke GmbH, Ruppichteroth; Thule GmbH, Neumarkt/Opf., both of Germany

[21] Appl. No.: 803,796
[22] Filed: Feb. 24, 1997

Related U.S. Application Data

[63] Continuation of Ser. No. 344,461, Nov. 23, 1994, abandoned.

[30] Foreign Application Priority Data

Nov. 24, 1993 [DE] Germany ............... 43 40 083

[51] Int. Cl.⁶ ............ B60R 9/055; B65D 43/22
[52] U.S. Cl. ............ 224/328; 220/332; 220/210; 220/324; 220/343; 70/159; 292/DIG. 17
[58] Field of Search ........... 224/328, 404; 70/159, 163, 166; 292/8, DIG. 17, 37, 39; 220/332, 333, 210, 324, 343

[56] References Cited

U.S. PATENT DOCUMENTS

| 147,973 | 2/1874 | Peyer | 292/8 |
|---|---|---|---|
| 3,640,423 | 2/1972 | Parker et al. | 224/404 |
| 4,643,005 | 2/1987 | Logas | 292/8 |
| 4,683,733 | 8/1987 | Marin | 292/8 |
| 4,997,118 | 3/1991 | Uebach et al. | 224/328 |
| 5,067,625 | 11/1991 | Numata | 220/343 |

FOREIGN PATENT DOCUMENTS

| 466915 | 11/1951 | Italy | 292/8 |
|---|---|---|---|
| 6127312 | 5/1994 | Japan | 224/400 |

*Primary Examiner*—Linda J. Sholl
*Attorney, Agent, or Firm*—Harness, Dickey & Pierce, P.L.C.

[57] ABSTRACT

A locking device for motor vehicle roof trunks has a bottom part and a lid. On two sides of the trunk (1), which extend parallel relative to one another, the lid (3) is pivotable by two hinges around a hinge axis relative to the bottom part (2). The hinges each include a first hinge part (14) associated with the lid (3) and a second hinge part (15) associated with the bottom part (2). All hinges have a common actuating rod (23) which includes hinge pins (30) movable parallel to the direction of the hinge axis (12). Each hinge pin (30) is movably guided in a bearing housing (21) associated with the bottom part (2) and may engage a sleeve (17) associated with the first hinge part (14). A cylinder lock (34) enables all hinges associated with one side to be actuated centrally by actuating the actuating rod 23 towards the closed or open position. By providing the actuating element in the form of an actuating rod (23) and through firm association of the hinge pins, actuation and strength of the locking device are improved.

9 Claims, 6 Drawing Sheets

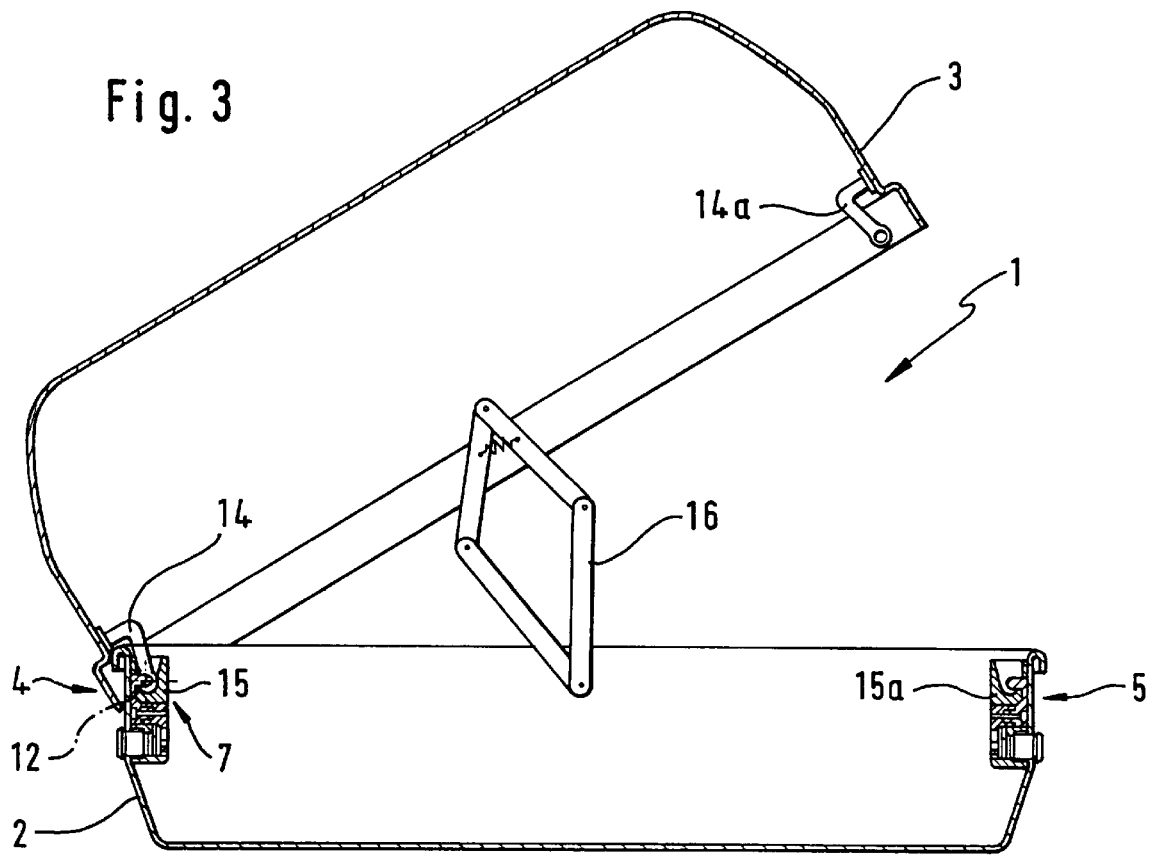
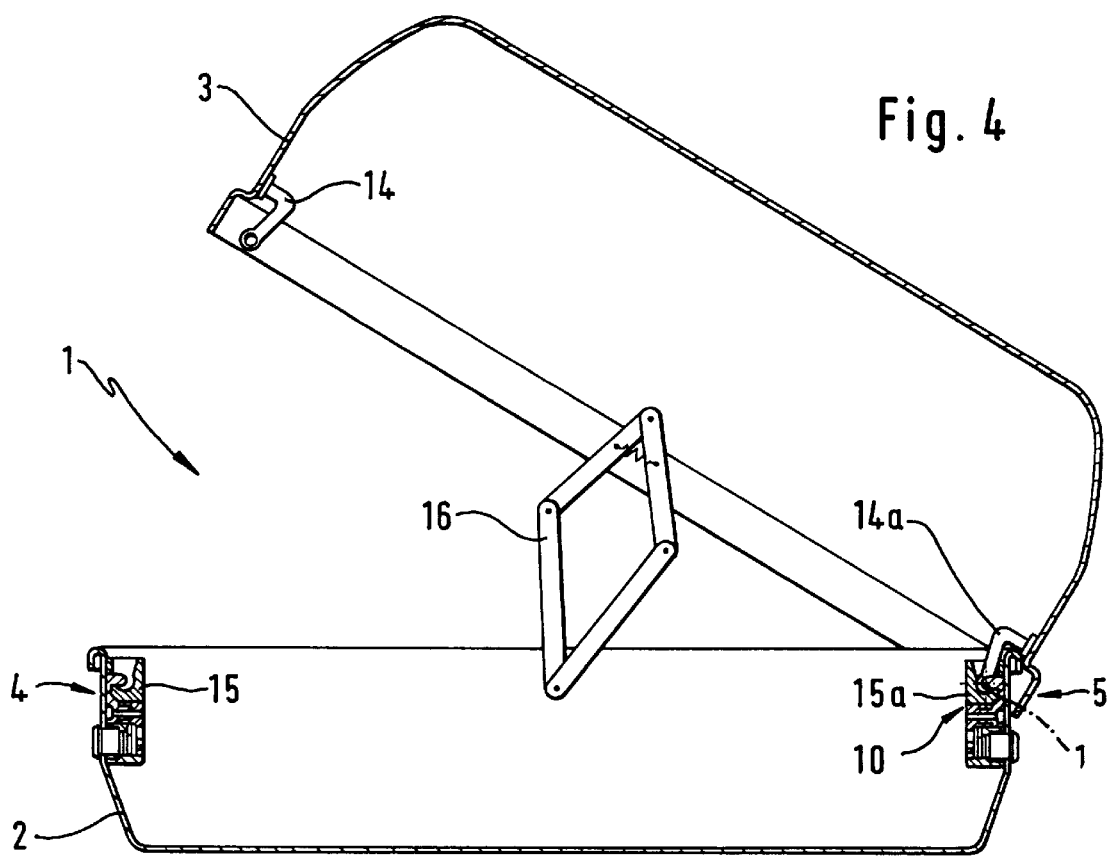

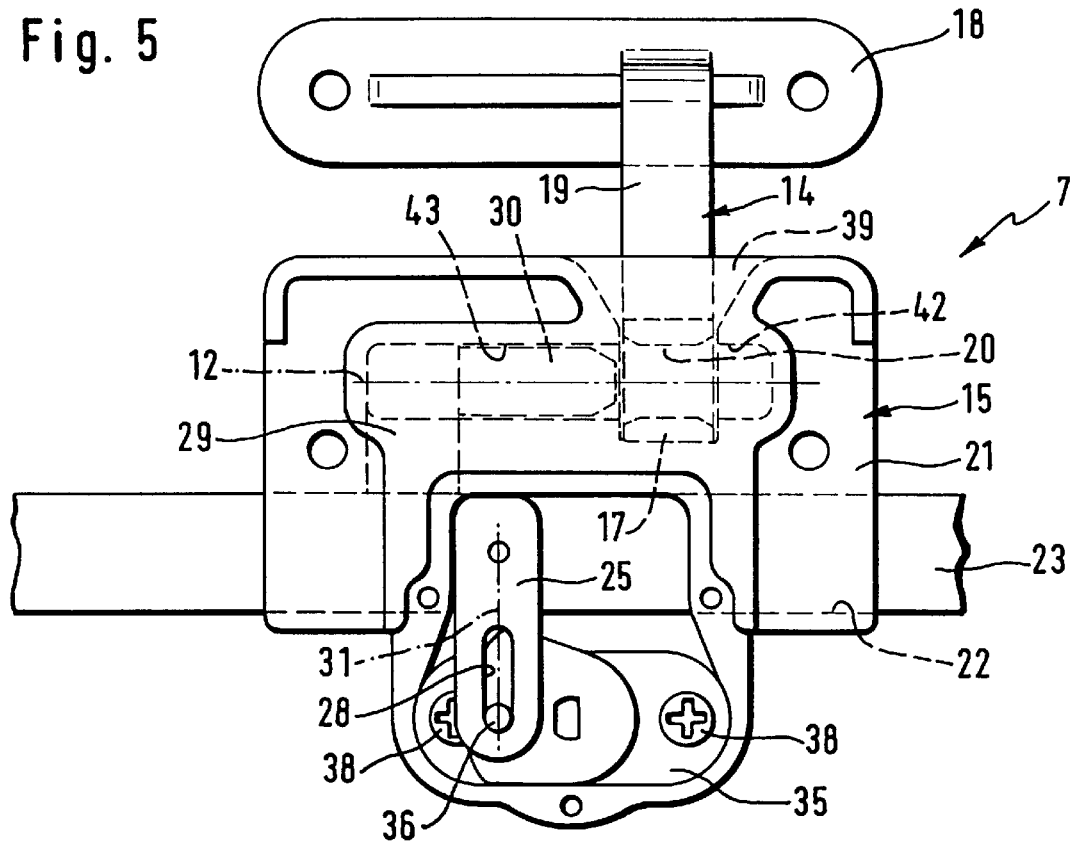
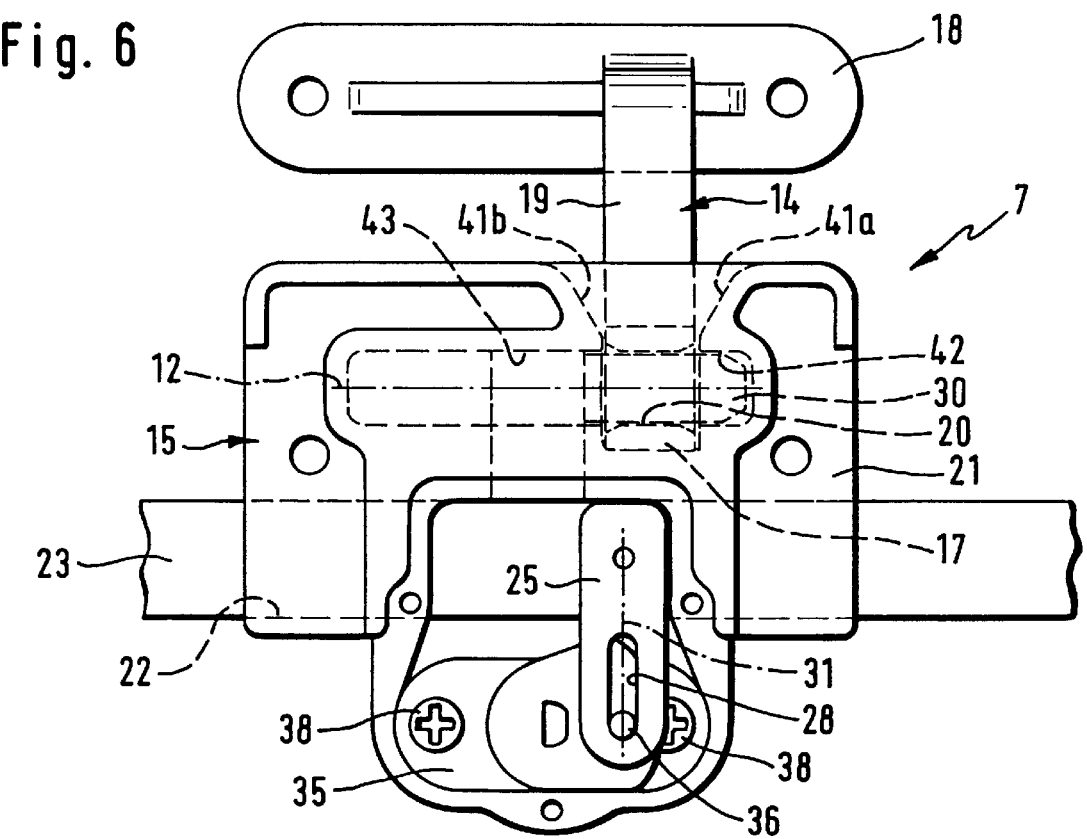

Fig. 7
Fig. 8
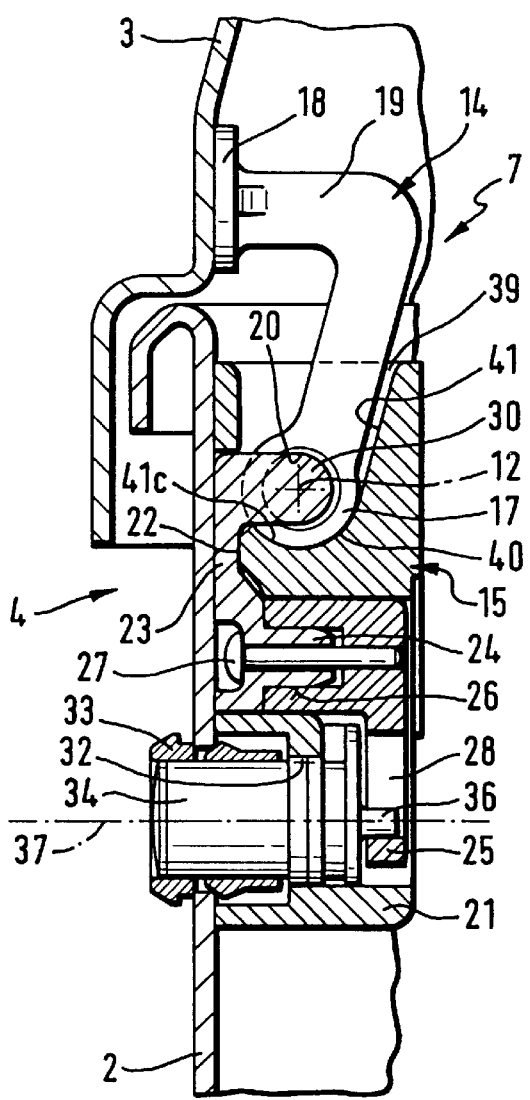
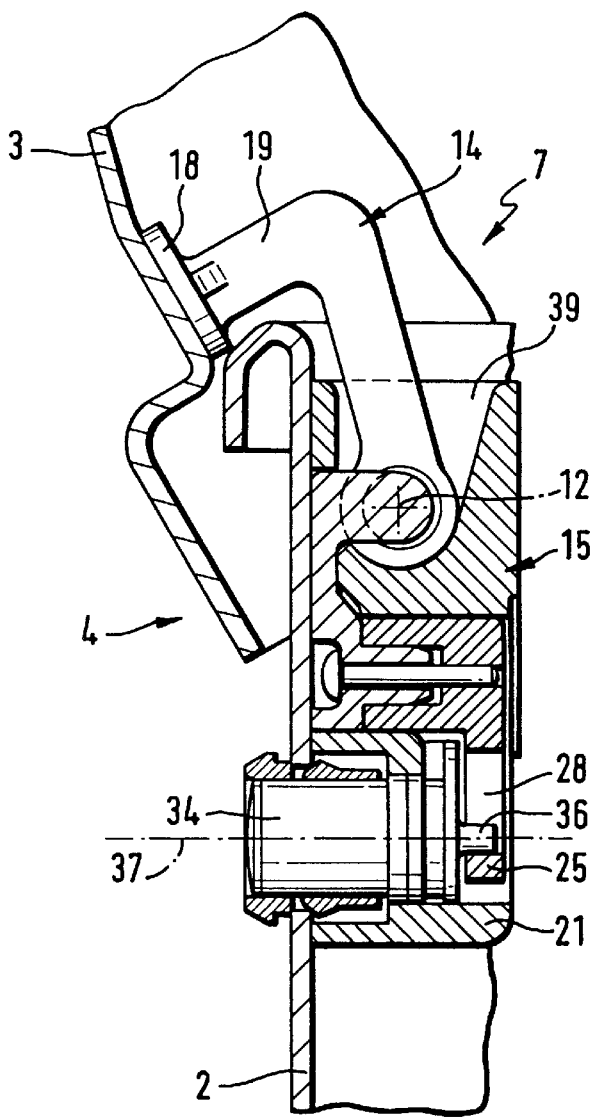

LOCKING DEVICE FOR SUITCASES AND TRUNKS, ESPECIALLY ROOF TRUNKS FOR MOTOR VEHICLES

This is a continuation of U.S. patent application Ser. No. 08/344,461 filed Nov. 23, 1994 now abandoned.

BACKGROUND OF THE INVENTION

The invention relates to a locking device for suitcases and trunks, especially roof trunks for motor vehicles. The trunk includes two trunk parts, a bottom part and a lid. On two sides, extending parallel relative to one another are positioned at least two hinges which are pivotable relative to one another around a hinge axis. The hinges each include a first hinge part, associated with the lid, and a second hinge part associated with the bottom part. All hinge parts, in the locked position, are connected to one another by an element which forms the hinge axis. Further, to pivot the lid around the hinge axis of the hinges associated with one of the sides, the hinge part associated with the hinges of the other side are disconnected by displacing the respective element, furthermore one lock is provided per side.

A roof trunk for a motor vehicle with a locking device is described in U.S. Pat. No. 4,420,105. Here, two parallel sides of the roof trunk are provided with hinge parts which correspond to one another and are designed as sleeves. To connect the hinge parts, a resilient cable is provided which extends through eyelets. The resilient cable, at the same time, forms the hinge axis. To open the roof trunk from one of the two sides, the cable is pulled out on the side to be opened, thereby releasing the connection between the eyelets of the lid and of the bottom part. This allows the lid to be pivoted relative to the bottom part around the cable which forms the hinge axis of the other side. Furthermore, per side, one of the pairs of eyelets associated with the lid and bottom part, respectively, is provided with an oblong hole which serves to receive both the cable and the shackle of a lock, so that the bottom part and lid are firmly connected to one another.

With such an embodiment, the lid and bottom part can only be guided approximately relative to one another since the cable is manually threaded in, it therefore is resilient. Furthermore, threading in the cable is complicated and time-consuming to succeed in releasing one of the sides. Threading in and pulling out the cable requires considerable manual skill and practice. Furthermore, the strength of the cable is not adequate to ensure secure guidance and closure in cases where the roof trunk is filled to such an extent that the lid has to be pressed onto the bottom part.

SUMMARY OF THE INVENTION

It is an object of the invention to provide a locking device for a roof trunk in which case opening can be effected from two parallel sides and whose actuation is simplified. Thus, it is possible to centrally lock and unlock the hinges on one side. Furthermore, it is an object to ensure that the two parts are held securely relative to one another in the closed condition.

In accordance with the invention, in each hinge, one of the hinge parts includes a sleeve, with the other one of the hinge parts including a hinge pin. The hinge pin, in the direction of the hinge axis, may be moved into and out of engagement with the sleeve. All hinge pins of the hinges associated with the one side are associated with a joint actuating rod which, per side, may be actuated by one single lock. The element constituting the hinge axis is formed by the hinge pin.

An advantage of the invention is that rigid hinge pins are provided, and that all hinge pins per side are connected to one common actuating rod. All hinge pins of one side form the hinge axis. By associating each hinge pin of each side with one actuating rod, it is possible to achieve simple guiding conditions. Thus, there is no longer any need for a threading operation. All hinge pins associated with an actuating rod are actuated simultaneously and are moved jointly in or out of engagement with the respective sleeves of the other hinge part.

This embodiment features a clearly defined and accurate hinge axis. Furthermore, the strength conditions are improved considerably so that if the trunk content is such that the lid is subjected to loads, the lid, too, is held securely relative to the bottom part.

In a further embodiment of the invention, the sleeve forms part of the first hinge part associated with the lid and the hinge pin forms part of the second hinge part associated with the bottom part.

The sleeve is preferably attached to an articulated arm provided with a fixing flange. The first hinge part is connected to the lid of the roof trunk by the fixing flange, through riveting for example.

To guide the actuating rod, the second hinge parts include a bearing housing. The bearing housing is preferably firmly connected to the bottom part. All bearing housings associated with one side are aligned in such a way that they guide the actuating rod.

The actuating rod is preferably actuated by a locking cylinder supported in a bearing housing of a hinge associated with the one side. For this purpose, the actuating rod includes a polygonal pin. An actuating lever is slipped onto the polygonal pin. The actuating lever includes an oblong hole which extends vertically relative to the actuating rod and which is engaged by an actuating pin which is provided to adjust the actuating rod and is eccentrically attached to the locking cylinder.

In order to center the bearing sleeves associated with the lid relative to the hinge pins associated with the second hinge part when closing the lid, each bearing housing of the second hinge part is provided with a centering recess. The recesses align the sleeves which cooperate therewith in the direction of the hinge pin.

Advantageous strength conditions are achieved if the hinge pins of all hinges associated with one side are formed onto the associated actuating rod. Thus, they are unitarily connected thereto in a material-locking way.

In order to further increase the strength available for holding the lid in the closed position relative to the bottom part of the trunk, it is proposed that, in the engaged condition, the hinge pin passes through the sleeve and enters a bore of the bearing housing. In this way it is possible to obtain doubly guided bearing means.

From the following detailed description taken in conjunction with the accompanying drawings and subjoined claims, other objects and advantages of the present invention will become apparent to those skilled in the art.

BRIEF DESCRIPTION OF THE DRAWINGS

A preferred embodiment of the invention is diagrammatically illustrated in the drawings wherein:

FIG. 3 is a view like FIG. 2 with the lid, relative to the bottom part, pivoted upwards into the open position around a first side.

FIG. 4 is a view like FIG. 3 with the lid, relative to the bottom part, pivoted upwards into the open position around a side extending parallel relative to the first side according to FIG. 3.

FIG. 5 is a plan view of a hinge, in the direction of arrow A according to FIG. 2, with the hinge pin being disengaged.

FIG. 6 is a view like FIG. 5, but with the hinge pin in the engaged position.

FIG. 7 is a section view of FIG. 1 along line VII—VII thereof, but with the lid in the closed condition and showing a locking cylinder to actuate the hinge pin of the associated actuating rod.

FIG. 8 is a sectional view like FIG. 7, but with the lid being pivoted into its open position relative to the bottom part.

DETAILED DESCRIPTION OF THE PREFERRED EMBODIMENTS

Figure 1:
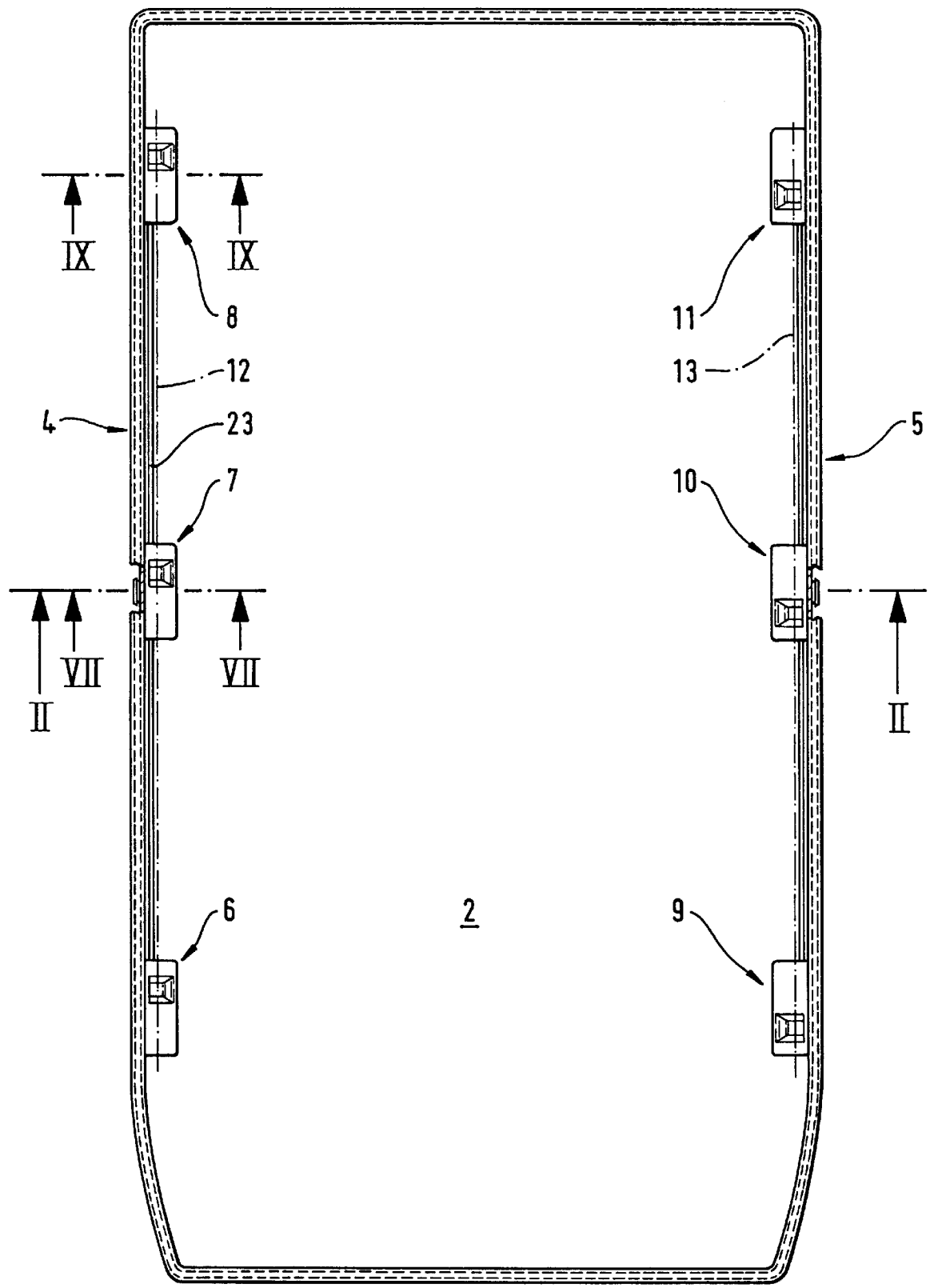
FIG. 1 is a top plan view of the bottom part of the roof trunk without a lid.
Figure 2:
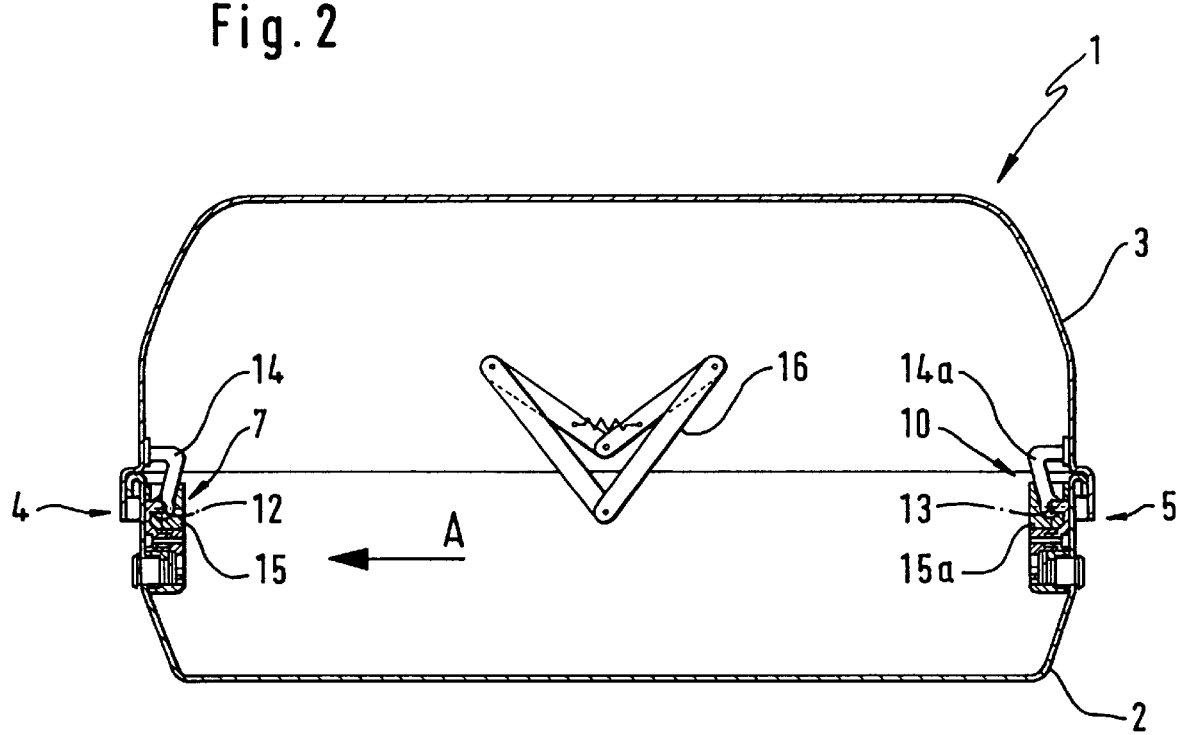
FIG. 2 is a section view of FIG. 1 along line II—II, with the lid shown in the closed condition relative to the bottom part.

FIGS. 2 to 4 show the roof trunk 1 with its lid 3 in different positions relative to its bottom part 2. FIG. 1 shows a top plan view of the upwardly open bottom part 2 of the roof trunk 1. In FIG. 2, the lid 3 is in the closed position relative to the bottom part 2. The lid 3 is upwardly pivotable around two parallel sides 4, 5, relative to the bottom part 2, in order to facilitate access to the roof trunk 1 from one selectable side of the vehicle to whose roof the roof trunk 1 is attached. The first side 4 is the lefthand side around which the lid 3, relative to the bottom part 2, is pivoted upwardly into the open position. This is achieved by the hinges 6, 7, 8 which are associated with side 4 and which are distributed along the first side 4 on the upper edge of the bottom part 2 and on the lower edge of the lid 3. As illustrated in FIG. 4, the lid 3, relative to the bottom part 2, is pivoted upwardly into the open position around the hinges 9, 10, 11 associated with the second, righthand side 5.

The hinge axis 12 is defined by the hinges 6, 7, 8 associated with the first side 4, whereas the hinge axis 13 is associated with the second side 5 and defined by the hinges 9, 10, 11. On the one hand, the hinges 6, 7, 8, 9, 10, 11 serve to define the hinge axes 12, 13 and at the same time they serve to fix the lid 3 in the closed position relative to the bottom part 2, as illustrated in FIG. 2.

FIGS. 2 to 4 illustrate each of the two central hinges 7 and 10, respectively. The hinges 7, 10 include a first hinge part 14, 14a and a second hinge part 15, 15a. The first hinge part 14, 14a is securely connected to the lid 3, whereas the second hinge part 15, 15a is securely connected to the bottom part 2. A lid support 16 is arranged between the bottom part 2 and the lid 3. The lid support 16 serves to support the lid 3 in the open position relative to the bottom part 2, as shown in FIGS. 3 and 4.

Below, the design of one of the central hinges associated with the two sides 4, 5 (hinge 7 associated with side 4) is described in greater detail with reference to FIGS. 5 to 8.

The first hinge part 14 is associated with the lid 3 and includes a fixing flange 18 fixed to the inside of the lid 3 towards the lower edge thereof. An arm 19 is coupled with the fixing flange 18. The arm 19 initially extends at a right angle inwardly and then, at an acute angle thereto, downwardly in the direction of the bottom part 2. At the free end of the arm 19, a sleeve 17 is attached which includes a bore 20 centered on the hinge axis 12.

The second hinge part 15 is associated with the bottom part 2. The second hinge part 15 is securely connected to the wall of the bottom part 2 in the region of its upper edge. The second hinge part 15 includes a bearing housing 21 with a guiding recess 22 which extends parallel to the hinge axis 12. These guiding recesses 22 associated with all hinges 6 to 9 on side 4, movably support a joint actuating rod 23 parallel to the hinge axis 12. In the region of the bearing housing 15 of each hinge, the actuating rod 23 carries a hinge pin 30 which is attached to an articulated arm, whose outer diameter is dimensioned to match the bore 20 of the sleeve 17 and which, in the closed condition, engages same.

A polygonal pin 24 projects from the actuating rod 23. An actuating lever 25 is slipped onto the polygonal pin 24 via a recess 26 formed to match the polygonal pin and securely connected to the actuating rod 23 by a connecting pin 27. The actuating lever 25 includes an oblong hole 28 whose axis 31 intersects the hinge axis 12 at a distance at a right angle.

The hinge pin 30 is securely connected to the actuating rod 23 by a fixing arm 29. The hinge pin 30, the fixing arm 29 and the actuating rod 23 are preferably a unitary one piece element.

Furthermore, the bearing housing 21 includes a receiving bore 32 for the locking cylinder 34. The receiving bore intersects the hinge axis 12 at a right angle. The locking cylinder 34 is secured in the bearing housing 21 by a flange 35 and bolts 38. A receiving sleeve 33 is inserted into the bearing house 21 from the outer face of the wall of the bottom part 2. The sleeve 33 receives the locking cylinder 34 such that it is rotatable around the rotational axis 37 by a key.

At the end of the locking cylinder 34, opposed to the locking cylinder end projecting from the bottom part 2, an actuating pin 36 is eccentrically positioned relative to the rotational axis 37. The actuating pin 36 projects into the oblong hole 28 of the actuating lever 25. By rotating the locking cylinder 34 around the rotational axis 37, the actuating pin 36 subjects the actuating lever 25 to a force which is transmitted by the latter to the actuating rod 23 which, in turn, displaces all hinge pins 30 connected thereto.

The bearing housing is also provided with a centering recess 39 which is engaged by the first hinge part 14 with the sleeve 17 and the arm 19 in the closed condition. The centering recess 39 is defined by centering faces 41, 41a, 41b, 41c which serve to center the outer face 40 of the sleeve 17 relative to the bearing housing 21. The centering faces 41, 41a, 41b, 41c serve to align the sleeve 17 with the help of the outer face 40 which comes to rest against said centering faces when approaching same. In the event of movement, for example, from the position shown in FIG. 4 into the closed condition as illustrated in FIG. 2, the hinge pin 30 is freely inserted into the bore 20 of the sleeve 17 as a result of the locking cylinder 34 displacing the actuating rod 23.

FIG. 8 shows the hinge 7 in a position which corresponds to the open position of the lid 3 relative to the bottom part 2 according to FIG. 3 so that any forces acting on the lid 3 and resulting, for example, from a load contained in the roof trunk interior may be received more easily in the closed condition according to FIG. 2, the bearing housing 21 includes a bore 42 which is entered by the hinge pin 30 after it passes through the bore 20 in the sleeve 17. Furthermore, the bearing housing 21, at the end of the centering recess 39 positioned opposite the bore 42, is provided with a supporting face 43, so that the hinge pin 30 is doubly guided and held.

FIG. 5 shows the hinge pin 30 and the formed-on actuating rod 23 in the open position. In this position, the lid 3 may move upwardly, with the first hinge part 14, with its sleeve 17 attached to the arm 19, moving upwardly out of the centering recess 39. FIG. 5 also shows that the actuating lever 25 and thus the actuating rod 23 are in a position where they are displaced towards the left. If the locking cylinder 34 is now actuated in the locking sense, the actuating lever 25 and thus the actuating rod 23 are displaced towards the right by the eccentrically arranged actuating pin 36.

The hinge pin 30 enters the bore 20 of the sleeve 17 of the first hinge part 14 and after passing through same, the hinge pin 30 moves into the bore 42 of the bearing housing 21. In this position, the two hinge parts 14, 15 are secured relative to one another. Thus, the first hinge part 14, associated with the lid 3, is able to carry out an angular movement relative to the second hinge part 15, associated with the side wall of the bottom part 2, such that it moves from the position shown in FIG. 7 into the position illustrated in FIG. 8 when the hinges associated with the other side are in the open position as shown in FIG. 5.

Figure 9:
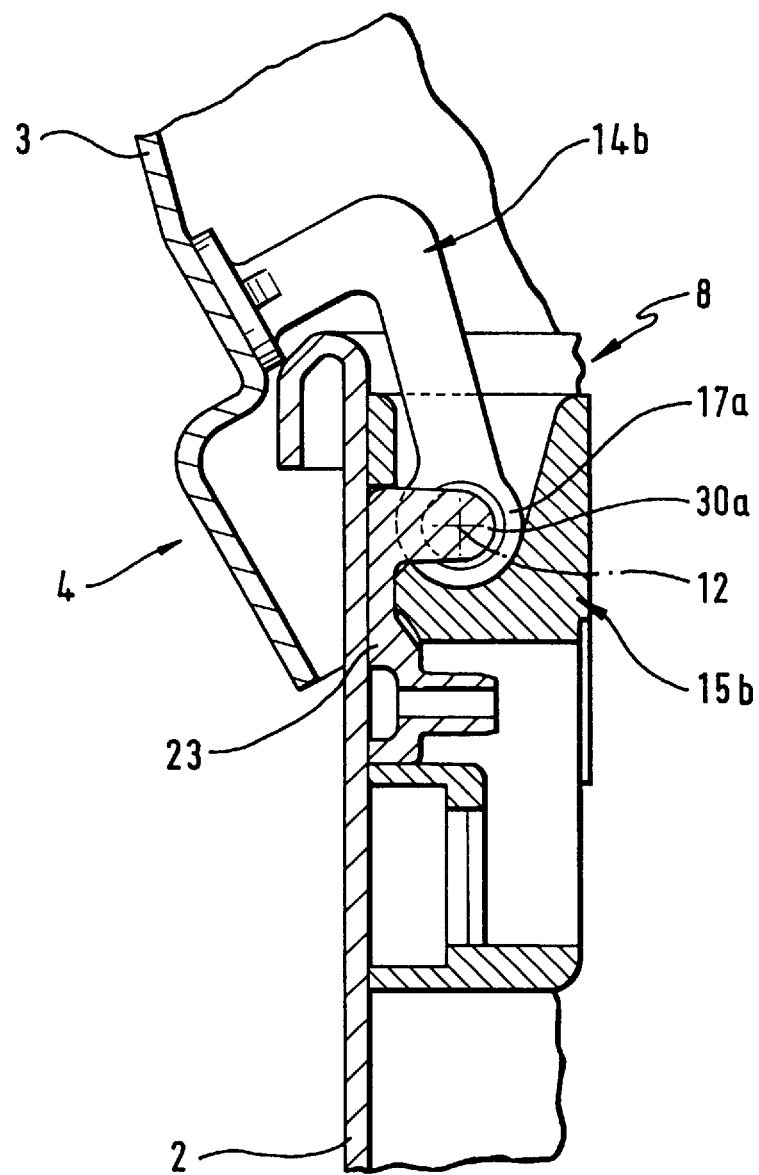
FIG. 9 is a sectional view like FIG. 8, but according to the sectional line IX—IX of FIG. 1 and with the hinge not including a locking cylinder, but with the hinge pin being actuated via the associated actuating rod by the lock associated with the central hinge.

The actuating rod 23 of each of the two sides 4, 5 is designed to be continuous so that it also includes, for example, the hinge pin 30a of the hinge 8, as illustrated in FIG. 9. The bearing housing 15b corresponds to that of hinge 7, but it does not include a locking cylinder. The latter is not required because the hinge pin 30a, associated with the actuating rod 23, which has a locking function is also moved into or out of engagement with the sleeve 17a of the hinge 8 during actuation of the actuating rod 23 and thus, makes use of the locking cylinder 34 associated with the hinge 7. Like the first side 4, the second side 5 includes three hinges 9, 10, 11 of which the central hinge 10 is also provided with a locking cylinder.

When the hinge pins 30, 30a of all hinges 6 to 11, associated with the sides 4, 5, are in a position as shown in FIG. 6 where the hinge pins pass through the bores 20 of the sleeves associated with the individual hinges 6 to 11, the closed position is achieved in which the lid 3 is held in firm contact with the bottom part 2, as shown in FIG. 2.

While the above detailed description describes the preferred embodiment of the present invention, the invention is susceptible to modification, variation, and alteration without deviating from the scope and fair meaning of the subjoined claims.

We claim:

1. A locking device for suitcases, trunks, or roof trunks for motor vehicles, with two trunk parts, a bottom part and a lid, said locking device comprising:

at least two first hinges and at least two second hinges, both said first hinges being pivotable relative to one another around a respective hinge axis, both said first and both said second hinges adapted for positioning on a first and second side of the bottom part and the lid for allowing the two trunk parts to be opened from either the first or second sides, said bottom part and lid extending parallel relative to one another, and each said first and second hinges having a first hinge part adapted for coupling with the lid and a second hinge part adapted for coupling with the bottom part and with said second hinge part connected to said first hinge part by a slidable non-biased joint actuating rod, the second hinge part includes a bearing housing in which the actuating rod is movably guided;

and either said first or second hinge part comprises a sleeve, with the other one of the hinge parts comprising a hinge pin which, in the direction of the hinge axis may be moved into and out of engagement with the sleeve, and said hinge pin being associated and movable with said joint actuating rod, said at least two first hinges actuatable by a single first lock and that the hinge axis of said at least two first hinges is formed by the hinge pins of said at least two first hinges, and said at least two second hinges actuatable by a single second lock and that the hinge axis of said at least two second hinges is formed by the hinge pins of said at least two second hinges.

2. A locking device according to claim 1, wherein the sleeve forms part of the first hinge part associated with the lid and that the hinge pin forms part of the second hinge part associated with the bottom part.

3. A locking device according to claim 2, wherein the sleeve is attached to an articulated arm provided with a fixing flange.

4. A locking device according to claim 1, wherein the actuating rod may be actuated by the locking cylinder supported in the bearing housing.

5. A looking device according to claim 1, wherein the actuating rod includes a polygonal pin onto which is slipped an actuating lever including an oblong hole which extends vertically relative to the actuating rod and which is engaged by an actuating pin provided for adjusting the actuating rod and eccentrically attached to the locking cylinder.

6. A looking device according to claim 1, wherein the bearing housing of the second hinge part includes a centering recess for the sleeve of the first hinge part.

7. A looking device according to claim 1, wherein the hinge pins of all hinges associated with one side are formed onto the associated actuating rod.

8. A locking device according to claim 1, wherein in the engaged condition, the hinge pin passes through the sleeve and enters a bore of the bearing housing.

9. A locking device for suitcases, trunks, or roof trunks for motor vehicles with two trunk parts, a bottom part and a lid, said locking device comprising:

at least two first hinges and at least two second hinges, said at least two first hinges adapted for positioning on a first side of the two trunk parts and said at least two second hinges adapted for positioning on a second side of the two trunk parts said at least two first hinges and said at least two second hinges cooperating together to allow the two trunk parts to be opened from either the first side or the second side, said at least two first hinges being pivotable around a hinge axis, said at least two first hinges adapted for positioning on a side of the bottom part and the lid, said bottom part and lid extending parallel relative to one another, and said at least two first hinges each having a first hinge part adapted for coupling with the lid and a second hinge part adapted for coupling with the bottom part, said second hinge part, being connected to said first hinge part by a slidable non-biased joint actuating rod, the second hinge part includes a bearing housing in which the actuating rod is movably guided;

a lock provided with said at least two first hinges;

and one of the hinge parts comprises a sleeve, with the other one of the hinge parts comprising a hinge pin which, in the direction of the hinge axis may be moved into and out of engagement with the sleeve, said hinge pin being associated and movable with said joint actuating rod which, is actuatable by the lock and said hinge axis is formed by the hinge pins of said at least two first hinges.

* * * * *

UNITED STATES PATENT AND TRADEMARK OFFICE
CERTIFICATE OF CORRECTION

PATENT NO. : 5,823,411
DATED : October 20, 1998
INVENTOR(S) : Rolf Gronwoldt, Siegfried Deisenhofer, Artur Hirtsiefer It is certified that error appears in the above-identified patent and that said Letters Patent is hereby corrected as shown below:

Title page,
Under [56] References Cited, under FOREIGN PATENT DOCUMENTS, please insert the following patent references which were not included in the printed patent:

| | | |
|---|---|---|
| 3925708 | Germany | 09/1990 |
| 3934292 | Germany | 04/1991 |
| 853371 | France | 03/1940 |
| 0422678 | EPO | 04/1991 |

Signed and Sealed this

Fourteenth Day of August, 2001

Attest:

NICHOLAS P. GODICI
Attesting Officer    Acting Director of the United States Patent and Trademark Office